United States Patent [19]

Warrikhoff

[11] 4,147,935

[45] Apr. 3, 1979

[54] METHOD AND APPARATUS FOR PRODUCING A RADIOLOGICAL IMAGE OF AN OBJECT

[76] Inventor: Harald F. H. Warrikhoff, Keplerstrasse 8-10, Berlin 10, Fed. Rep. of Germany, D1000

[21] Appl. No.: 546,086

[22] Filed: Jan. 31, 1975

[30] Foreign Application Priority Data

Mar. 4, 1974 [DE] Fed. Rep. of Germany ....... 2410230

[51] Int. Cl.$^2$ .............................................. G03B 41/16

[52] U.S. Cl. ......................... 250/416 TV; 250/358 R; 250/402

[58] Field of Search ............... 250/358, 359, 360, 366, 250/367, 394, 395, 401, 402, 416 TV

[56] References Cited

U.S. PATENT DOCUMENTS

| | | | |
|---|---|---|---|
| 2,837,657 | 6/1958 | Craig | 250/416 TV |
| 3,860,821 | 1/1975 | Barrett | 250/366 |

*Primary Examiner*—Craig E. Church
*Attorney, Agent, or Firm*—Ernest M. Junkins

[57] ABSTRACT

A method and apparatus for producing an image of the X-ray attenuation characteristics of an object by positioning the object between a source of X-rays and a normally stationary X-ray sensing detector unit. The unit has a group of individually responsive detectors that sense a subfield consisting of a plurality of small contiguous detail areas of the object for a position of the X-ray source and the X-ray source is moved step-wise to sequential other positions to cause contiguous subfields to be sequentially sensed, each of which includes the plurality of detail areas.

14 Claims, 5 Drawing Figures

Fig. 1
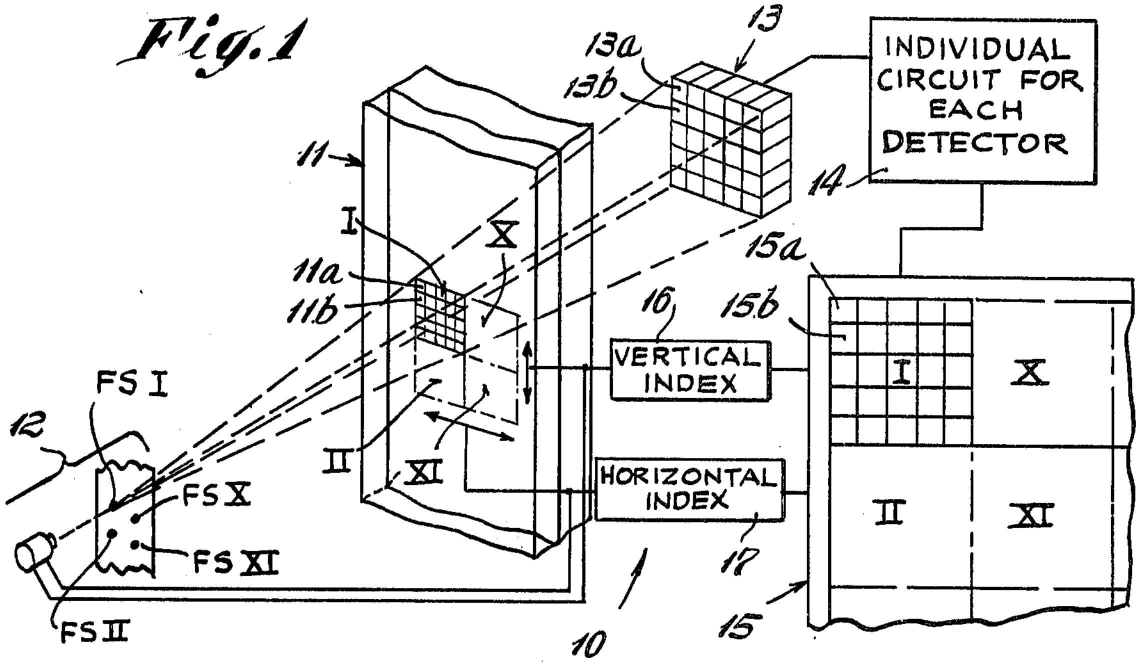
Fig. 2
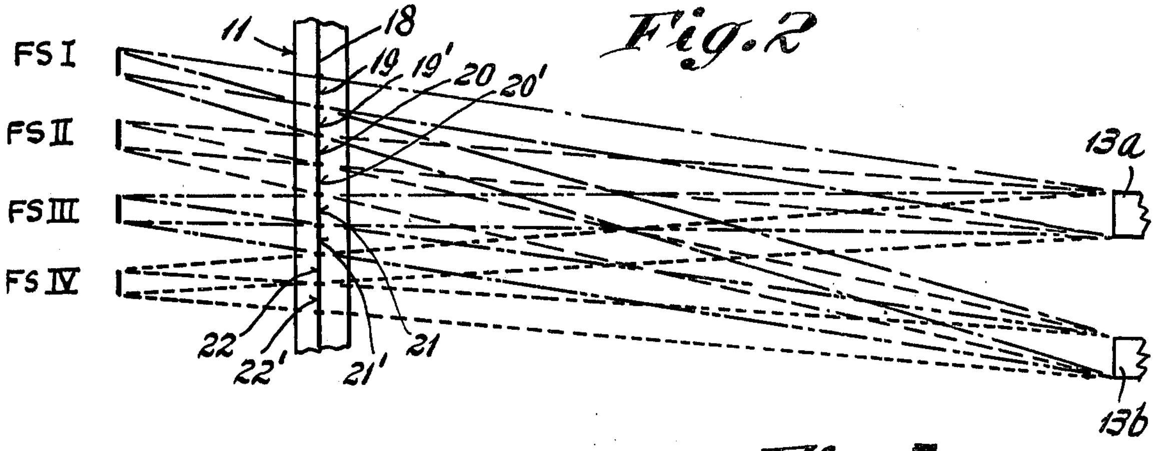
Fig. 3
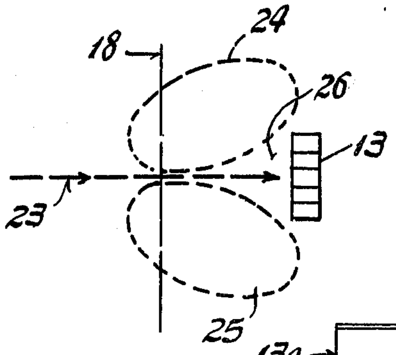
Fig. 5
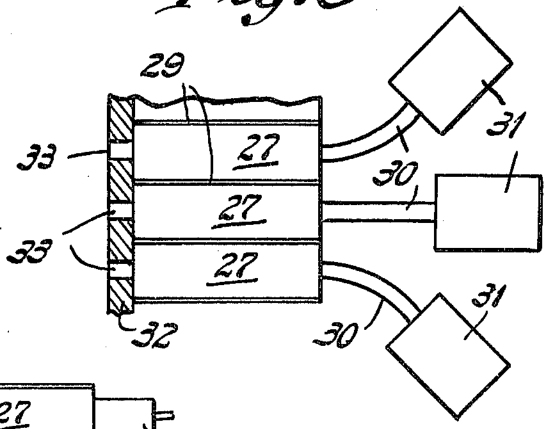
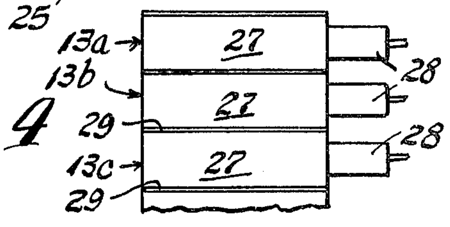
Fig. 4

METHOD AND APPARATUS FOR PRODUCING A RADIOLOGICAL IMAGE OF AN OBJECT

The present invention relates to producing an image of the X-ray attenuation or penetration characteristics of an object. The object is placed between an X-ray source and a detector means with the detector means being responsive to the intensity of the X-rays it receives and utilized to generally form a visually perceptive image.

The X-ray source is usually a small point sometimes referred to as a focal spot, the object is relatively large and the detecting means takes many forms depending on the manner in which the system is to operate. One system that may be employed has a large sensing area detecting means, such as a photographic film or a fluorescent screen. All the rays from a stationary X-ray source pass through the object and are simultaneously sensed by the detector means to form the image. In the fluorescent screen system, the image produced may be intensified by electro-optical devices and then scanned by a TV pick-up tube, point by point, to produce a visible image on a television type monitor.

An object in absorbing X-rays also tends to produce additional X-rays called scattered radiation. As scattered radiation tends to also be sensed by the detector means, the same as X-rays originating at the focal spot, it accordingly introduces distortion into the image. Thus, as the size of the sensing area of the detector means increases, to increase the area of the object being simultaneously sensed, the scattered radiation also increases to decrease the accuracy of the image.

To reduce the effect of scattered radiation, systems have been proposed which reduce the size of the sensing area by causing relative movement between the focal spot and the object. One type of system is shown in U.S. Pat. No. 3,808,444 in which the sensing area is stationary and limited to being a thin vertical line that has the height needed for the complete height of the area desired to be sensed. The object is moved horisontally to produce a large size area image. In one embodiment, the focal spot is stationary and the detecting means includes a plurality of individual small sensing area detectors while in another embodiment a linear sensing area is used together with, in effect, a vertically linearly moving focal spot. However, the single sensing area, while minimizing the effects of horizontal scattered radiation, is still subject is sensing vertical scattered radiation. Moreover, the distance from the focal spot to the object, respectively to the scanning area, has to be comparatively large, in order to avoid the radiation paths going too much obliquely through the object.

Other systems have proposed scanning a large object area by combining a stationary somewhat small area detector, a stationary object and a focal spot that is relatively moved both horizontally and vertically over a relatively large area.

A mechanical system that employs a movable disk having a plurality of pin holes which effectively makes a stationary X-ray source appear to move has been proposed while the actual movement of the focal spot within the tube has also been proposed, both being described in The Encyclopedia of X-rays and Gamma Rays published by Reinhold Publishing Company of New York, pages 510–513 inclusive being pertinent. Another moving X-ray source system is disclosed in German Patent No. 1,089,487 in which a focal spot is moved in a raster pattern on a large size target and the X-rays are transmitted to the object through the target to a stationary detector.

While the focal spot moving tube systems are not limited, as to scanning speed by mechanical movement, the use of a single detector to form a television type image necessitates determining it, for example, a German television raster pattern is used, about 400,000 different points per image. Sensing such a large number of points consequently minimizes the duration during which the detector can respond to the quantity of X-rays at each point and as there is a response time relationship in the conversion of X-rays received to value of usable electrical signal, the short duration permits only a small amount of X-rays to be received so that the electrical signal converted in the detector is of less accuracy.

It has also been proposed to use a detector that only has a small sensing area and mechanically move it with respect to either a stationary X-ray source or one that moves. However, such movable detector systems have been found to be quite slow in producing an image.

Thus, while some systems use large area detectors that enable simultaneous detection of a large area but yet have reduced accuracy because of scattered radiation, other systems that employ scanning or moving spots have been found to be too slow because of mechanical devices, the object is spaced too far from the source of the X-rays reducing the X-ray intensity for sensing and/or they do not enable within a commercially acceptable time interval, to receive so many X-rays by the detecting unit, that the signal is well above the noise line and of sufficient accuracy.

It is accordingly an object of the present invention to provide an X-ray system and method for producing an accurate radiological image in which the effects of scattered radiation are minimized.

Another object of the present invention is to achieve the above object with a system and method that produces a high resolution image by individually sensing a large number of individual small areas of the object.

A further object of the present invention is to provide an X-ray system that uses a moving focal spot in which the spot is moved in successive steps from one position to another and in which at each position, a subfield of the object is sensed by a stationary detector means.

Still another object of the present invention is to provide an X-ray system and method that uses a stationary detector means which is capable of sensing a plurality of individual contiguous small detail areas in the object for each position of the focal spot.

In carrying out the present invention, there is provided a system which uses a focal spot source of X-rays that is capable of being accurately moved and positioned. One example of such a tube is that disclosed in the above-noted German patent while another is disclosed in U.S. patent application Ser. No. 543,124 entitled "Movable Focal Spot X-ray Tube" and filed by Harald F. H. Warrikhoff and Siegfried Heller on Jan. 22, 1975. While the invention is not to be considered as being solely limited to such a moving focal spot tube, such a tube may be desirable as it enables the object to be positioned quite closely to the focal spot, thereby minimizing attenuation caused by the distance that the X-rays must traverse to the detector means.

Positioned on the other side of the object is a detector means that includes an array composed of a plurality of closely spaced, single detectors, each having a small sensing area. Each detector is capable of providing a signal related to the intensity of the X-rays impinging on its small sensing area and thus each detector senses a small detail area on a plane of acuity through the object. Further, the focal point, object and detector array are relatively positioned so that adjacent detectors sense adjacent small detail areas that are contiguous. Thus, at one position of the X-ray source, a subfield image of a somewhat large area of the object is produced by combining the small object detail areas that are simultaneously sensed by each detector.

The focal spot is then stepped to its next position wherein it causes the detector means to sense another subfield that is contiguous to the previous subfield. Appropriate circuitry is provided to correlate the information from the detector means to a position on an image forming means that corresponds to the current position of the focal spot. In this manner, an object is scanned subfield by subfield to produce an accurate high resolution image of the objects' X-ray attenuation characteristics.

A further feature of the present invention resides in the selection of the size of the detector array to effectively eliminate distortion which scattered radiation could introduce. The size of the array is limited to being sufficiently small so that it is locatable in a position outside of the major pattern of distribution of the scattered radiation rays, thus reducing the possible sensing of said scattered radiation.

Other features and advantages will hereinafter appear.

In the drawing:

FIG. 1 is a diagrammatic illustration of an X-ray system that practices the present invention.

FIG. 2 is a planar diagrammatic sketch of a few relative positions of the focal spot, object detail areas sensed and two adjacent detectors.

FIG. 3 is a sketch showing the relative size and position of the detector means in relation to the intensity distribution pattern of scattered radiation.

FIG. 4 is an illustration of a portion of one form of a detector array that may be employed.

FIG. 5 is an illustration of a portion of another embodiment of a detector array.

Referring to the drawing, the X-ray system of the present invention is generally indicated by the reference numeral 10 and is preferably utilized to provide a visible image of the X-ray attenuation characteristics of an object 11. An X-ray source 12 is positioned on one side of the object to direct X-rays towards the object while a detector array 13 is positioned on the other side of the object. The detector array includes a plurality of individual detectors 13*a*, 13*b*, etc., while a block 14 has a separate electrical circuit for each detector for producing an electrical signal related to the intensity of the X-rays received by its associated detector. The signals are transferred to a viewing monitor 15.

The monitor accepts the signals from the block 14 and if a television type monitor will produce a visual image related to the intensity of the signal from each detector at a specific location the portion 15*a* of the viewing monitor 15 will have the image of the detail area 11*a* that is sensed by the detector 13*a*. Similarly, detector 13*b* controls the image in the portion 15*b* of the viewing monitor and is responsive to the attenuation characteristics of the detail area 11*b* of the object.

It will be understood that each of the other detectors has its own image formed on the monitor 15 for the detail area of the object that it senses. All the detector images are produced essentially simultaneously and form on the monitor a subfield image I of the subfield area denoted by the character I in the object. The relative position of the subfields are determined by the position of the movable focal spot with the location of FSI being that for producing the subfield image I on the monitor for the subfield area I of the object.

In accordance with the present invention, the focal spot after being located at FSI for a selected time interval is then stepped to an adjacent position denoted by FSII. This causes the detector array to be responsive to the subfield area II in the object to produce on the viewing monitor the subfield image denoted II. In order to correlate the vertical position of the subfield image with the position of the focal spot, a vertical index means 16 is provided for causing the same relative stepwise movement of the electron beam in the X-ray source 12 and in the subfield image in the viewing monitor 15. Further, a horizontal index means 17 is employed to correlate the X-ray source position and image subfield position. Thus, if the focal spot is located at FSX (the top of the next vertical row) then the image subfield would appear at the portion X of the monitor and be the image of the object subfield area X. The focal spot can then be moved to position FSXI to sence the object subfield area XI and produce the subfield image XI on the monitor, the next lower location in the second vertical row.

While only two vertical and two horizontal positions of the focal spot have been shown it will be clear that the invention contemplates having a substantial number thereof depending on the size of the complete area of the object desired to be scanned, with for example perhaps 10 subfield images per vertical row. Moreover, the object subfields may be sensed in horizontal rows with step-wise vertical movement to the next row. In either event, the focal spot is moved in steps.

One form of moving focal spot tube that may be employed is that disclosed in the above-noted German patent and the index means could include slope generators for effecting the step-wise movements in both the tube and monitor. Also a flat multi-cathode X-ray tube may be used if desired.

Shown in FIG. 2 is a diagrammatic illustration of the two adjacent detectors, such as 13*a* and 13*b* together with four focal spots FSI, FSII, FSIII and FSIV that are linearly located. The object 11 is also shown and it has a plane of acuity 18 where it may be assumed that the different object detail areas sensed are positioned. For the position FSI, object detail areas 19 and 19' are sensed by the detectors 13*a* and 13*b*, respectively. The focal spot and detectors are positioned with respect to the plane of acuity such that the detail area 19' is contiguous with the detail area 19 with a minimum of overlapping and with a minimum of space therebetween so that the two portions may consider to be abutting. When the focal spot is shifted to the position FSII, the detail areas 20 and 20' are sensed by the detectors 13*a* and 13*b*, respectively while the focal spot position FSIII causes sensing of object detail areas 21 and 21' and focal spot position FSIV effects sensing of areas 22 and 22' by the detectors.

In accordance with the present invention the small detail areas sensed by each detector are thus made to be contiguous while the sum or total area of the detail areas for a focal spot position constitutes a subfield area. Each subfield area is made to also be contiguous with the subfield area sensed at its adjacent focal spot position. Thus, as shown, the subfield area consisting of detail areas 20 and 20' for focal spot position FSII are contiguous with the subfield consisting of detail areas 19 and 19' for the focal spot position FSI and the subfield consisting of detail areas 21 and 21' for the focal spot position FSIII.

The focal spots are shown somewhat enlarged for clarity of illustration. It is contemplated that each of the detail areas sensed by each detector may be perhaps just two tenths of a millimeter in length and width thereby providing an image having an extremely high resolution by reason of it independently sensing very small areas of the object.

The extent of the array, i.e., the number of detectors and hence its area are limited in accordance with the present invention to minimize the effect of scattered radiation. Thus, referring to FIG. 3 there is shown the plane of acuity 18 together with one symbolic X-ray 23. The ray 23 when striking the object produces scattered radiation having a pattern of intensity distribution basically as shown by the slopes 24 and 25. There is thus a somewhat triangular area indicated by the reference numeral 26 in which very little scattered radiation is present. As this figure is a planar diagram and the distribution is three dimensional, the area 26 is essentially a cone. The extent of the array 13, is limited as to size and position so that it fits within this cone of minimized scattered radiation. In this manner the present invention substantially eliminates a major distortion producing effect which results from having a somewhat large sensing array as heretofore mentioned. The size of the array may be easily varied by the number of effective detectors 13*a*, 13*b*, etc. with one contemplated array having 100 detectors formed in 10 rows with 10 detectors per row.

Shown in FIG. 4 is a portion of an array having three detectors 13*a*, 13*b* and 13*c* each of which preferably includes a long and narrow scintillation crystal formed of ceasium iodine or sodium iodine together with a light sensitive photo-diode. The detector 13*a* has a crystal that is indicated by the reference numeral 27 while the diode is indicated by the reference numeral 28. The crystals are separated by a shield 29 positioned between adjacent detectors and is formed of X-ray absorbing material as for example lead, to minimize passage of X-rays between detectors. The other detectors are identical and hence have the same parts indicated by the same reference numerals.

FIG. 5 discloses a portion of another embodiment of an array 13 with each of the detectors including the crystal 27. However, rather than a light sensitive photodiode, a length of light conducting fiber 30 is employed for directing the light from the crystal to a photomultiplier tube 31 to form the electrical signal. The shielding 29 is also present in this embodiment and in addition an apertured screen 32 having a small aperture 33 for each crystal is used for limiting X-ray admission to the crystal 27 to only those rays that pass through its opening 33 thereby sustaining the resolution though the crystal is larger in diameter in order to absorb those X-rays to a high extent arrive under an angle to the crystal axis.

It will be understood with respect to the present invention that if, for example, there are 100 detctors, namely, an array 10 × 10, then each detector can be subjected to and hence measure the intensity of rays for a hundred times longer than if only one detector were used and 100 points are consecutively scanned. This increased time for sensing the same subfield area of the object enables more X-rays to strike the crystal where they are transmitted into sensible light and hence increase the accuracy and constrast of the image. Moreover, with such an array and if it is desired to produce an image having 400,000 points then only 4,000 focal positions of the X-ray source are needed rather than in effect 400,000. Additionally, while one type of tube has been shown it will be clear that other types of tubes may be used to produce X-ray emissions at desired positions preferably by controlling the electron beam that strikes the target to produce the focal spot.

It will accordingly be understood that there has been disclosed an apparatus and method of producing a radiological image of an object in which the complete image is formed by a plurality of successive subfield images of the attenuation characteristics of subfield areas of the object. Each subfield is subdivided into individual detail images of a plurality of small contiguous detail areas of the object, so that a high resolution of each subfield image is obtained. Each of the subfields is made to be contiguous with an adjacent subfield and the shifting from one subfield to the next is achieved by causing the focal spot to be stepped to the position where the next subfield area of the object is caused to be aligned between the X-ray source and the detector means. Thus, by sequentially moving the focal point to a number of positions, an image having a high resolution may be formed of a large area object.

The system includes a detector array that includes a plurality of individual detectors with each being capable of providing a separate image of its small detail area of the object in each subfield. The effect of scattered radiation is substantially minimized by having the detector array, even though including a plurality of detectors be limited as to size and position, to be normally within the cone of minimized scattered radiation produced in the object. In this manner and also because a subfield may be subjected to radiation longer than a point by point scanning system, the system is capable of producing a highly accurate image of the object.

Variations and modifications may be made within the scope of the claims and portions of the improvements may be used without others.

I claim:

1. The method of producing a radiological image of an object having a plurality of subfield areas comprising the steps of providing an X-ray focal spot and a detector unit with the detector unit comprising an array of a plurality of individual X-ray detectors closely grouped together, placing the object between the focal spot and the detector unit, limiting and positioning the array to a position with respect to the object to be normally within the low intensity distribution cone produced by scattered radiation in the object, and forming a subfield image of a subfield area by using the X-rays detected simultaneously by the individual detectors.

2. The invention as defined in claim 1 in which there is the step of positioning the focal spot at an adjacent position while maintaining the detectors stationary to form another subfield image of another subfield area of the object.

3. The invention as defined in claim 2 in which the another subfield area is adjacent the first mentioned subfield area and in which the step of positioning the focal spot locates the focal spot at a position where the another subfield area abuts the first mentioned subfield area.

4. The invention as defined in claim 1 in which the complete radiological image includes a plurality of subfield images, in which there is a different focal spot position for each different subfield image and in which there is the step of correlating the position of each subfield image in the complete radiological image with the position of the focal spot.

5. The invention as defined in claim 4 in which the positions of the focal spot are located along two directions and in which the step of positioning includes moving the focal spot at least along one direction.

6. The invention as defined in claim 1 in which each detector is responsive essentially only to X-rays passing through a small detail area in a plane of acuity passing through the object to produce a small detail image thereof and in which there is the step of arranging and positioning the detectors to sense essentially contiguous small detail areas.

7. The invention as defined in claim 6 in which the step of forming the subfield image includes positioning the small detail images in the same location on the subfield image that the detector for each small detail image has in the array of detectors.

8. The invention as defined in claim 7 in which there is a plurality of subfield images and the step of forming positions the small detail image from each detector in the same position in each subfield.

9. An X-ray scanning system for producing a radiological image of an object comprising means for forming an X-ray focal spot, means for locating the focal spot at any one of a plurality of different positions, and image producing means for receiving the X-rays that pass through the object to produce the image thereof, said image forming means including an array of detectors with each providing a signal of the X-rays it receives and in which the array is limited and positioned to be normally within the low intensity distribution cone produced by scattered radiation in the object and image forming means for producing an image based on the signals from the detectors.

10. The invention as defined in claim 9 in which the object has a plurality of subfield areas, in which the image has a plurality of subfield images in which signals from the detectors are combined to provide a single subfield image of a single subfield area of the object and in which there is a different subfield image and subfield area for each different position of the focal spot.

11. The invention as defined in claim 10 in which there are means for correlating the position of each subfield image on the image forming means with the position of the focal spot.

12. The invention as defined in claim 11 in which each detector includes a narrow elongate scintillation crystal having a sensing area face and in which the crystals are positioned in the array with the faces directed towards the focal spot.

13. The invention as defined in claim 12 in which X-ray absorbing material is positioned between adjacent crystals.

14. The invention as defined in claim 12 in which there is a screen means positioned adjacent the face of a crystal and formed to have a smaller aperture than the face of the crystal for limiting the X-rays received by the crystal face.

* * * * *